(12) United States Patent
Jeong et al.

(10) Patent No.: US 11,288,547 B2
(45) Date of Patent: Mar. 29, 2022

(54) METHOD FOR INSERTING DOMAIN INFORMATION, METHOD AND APPARATUS FOR LEARNING OF GENERATIVE MODEL

(71) Applicant: SAMSUNG SDS CO., LTD., Seoul (KR)

(72) Inventors: Yong-Hyun Jeong, Seoul (KR); Hyun-Jin Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 82 days.

(21) Appl. No.: 16/668,280

(22) Filed: Oct. 30, 2019

(65) Prior Publication Data
US 2021/0125003 A1  Apr. 29, 2021

(30) Foreign Application Priority Data

Oct. 29, 2019 (KR) .................. 10-2019-0135804

(51) Int. Cl.
| | | |
|---|---|---|
| *G06K 9/00* | (2006.01) | |
| *G06K 9/62* | (2022.01) | |
| *G06T 7/143* | (2017.01) | |
| *G06T 7/11* | (2017.01) | |

(52) U.S. Cl.
CPC ......... *G06K 9/6262* (2013.01); *G06K 9/6244* (2013.01); *G06T 7/11* (2017.01); *G06T 7/143* (2017.01)

(58) Field of Classification Search
CPC ........ G06N 20/00; G06N 3/0454; G06N 3/08; G06F 16/51; G06K 9/6262; G06K 9/46; G06T 2207/20081; G06T 2207/20084
See application file for complete search history.

(56) References Cited

U.S. PATENT DOCUMENTS

| | | | |
|---|---|---|---|
| 2020/0118043 A1* | 4/2020 | Venkataramani | G06K 9/00973 |
| 2020/0272860 A1* | 8/2020 | Uchiyama | G06N 20/00 |
| 2020/0364624 A1* | 11/2020 | Kearney | G16H 50/20 |

FOREIGN PATENT DOCUMENTS

KR    10-2019-0017242 A    2/2019

* cited by examiner

*Primary Examiner* — Li Liu
(74) *Attorney, Agent, or Firm* — The PL Law Group, PLLC

(57) ABSTRACT

An apparatus for learning of generative model according to an embodiment includes an encoder configured to extract a feature from input data and output a feature vector, a decoder configured to restore the input data on the basis of the feature vector, and a domain module configured to generate domain information to be learned through a generative model into domain vector blocks, each with a size corresponding to the feature vector, concatenate the feature vector and the domain vector block, and input a concatenated vector to the decoder.

10 Claims, 9 Drawing Sheets

FIG. 7
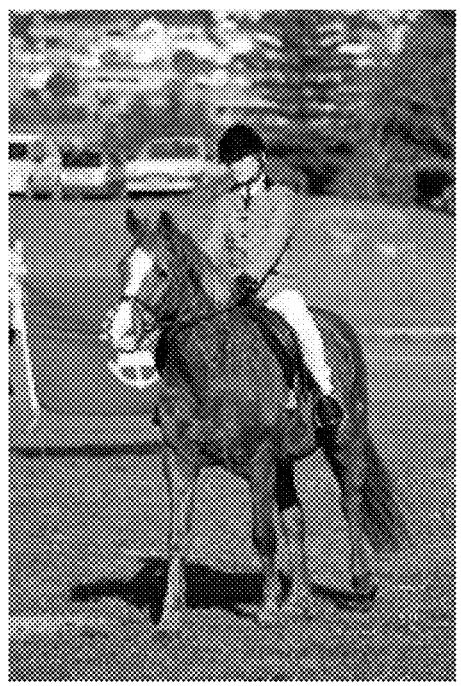 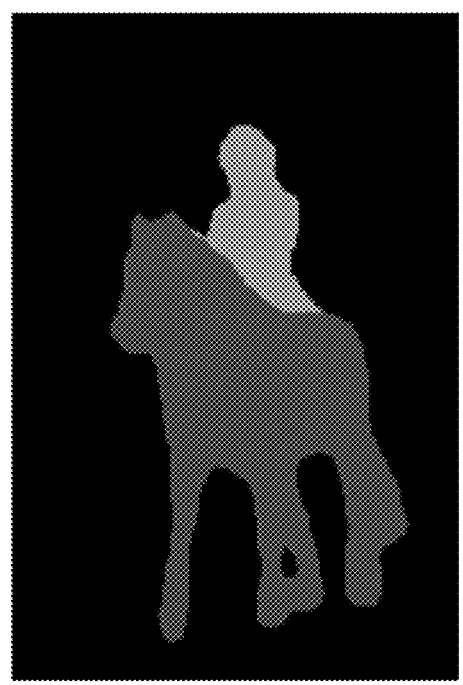
(a) (b)

METHOD FOR INSERTING DOMAIN INFORMATION, METHOD AND APPARATUS FOR LEARNING OF GENERATIVE MODEL

CROSS REFERENCE TO RELATED APPLICATIONS AND CLAIM OF PRIORITY

This application claims the benefit of Korean Patent Application No. 10-2019-0135804 filed on Oct. 29, 2019 in the Korean Intellectual Property Office, the disclosure of which is incorporated herein by reference in its entirety.

TECHNICAL FIELD

The following description relates to a technology for effective learning of a generative model.

BACKGROUND ART

Recently, an artificial intelligence (AI) system that implements human-level intelligence has been used in various fields. Unlike an existing rule-based smart system, the AI system is a system in which a machine learns and judges itself. The AI system mainly uses a learning method through deep learning.

One of learning methods through deep learning is a generative mode. Examples of the generative model include a variational-auto encoder (VAE), a generative adversarial network (GAN), and the like. For example, the generative model is a deep learning model that extracts a feature from an input image, restores a new image on the basis of the extracted feature, and outputs the restored image.

In the existing generative model, a different generative model is created and learned for each domain when outputting a different result for each domain (e.g., hairstyle, race, gender, and the like), and thus it is disadvantageous in that the number of generative models increases as the number of domains increases.

In addition, a method of generating results according to several domains using one generative model (single generative model) is used, but it is disadvantageous in that the amount of computation for learning significantly increases as the number of domains increases. That is, conventionally, domain information, together with an image, is added as an input to the single generative model to generate a different result. To this end, domain information is input through several domain channels separate from a channel for inputting image information and is learned. In this case, as the number of domains increases, learning parameters are increased, resulting in an increase in the amount of computation for learning and a decrease in learning speed.

Thus, there is a need for a method capable of preventing a decrease in learning speed while using a single generative model.

SUMMARY

The disclosed embodiments are intended to provide a new technique for inserting domain information into a generative model.

In one general aspect, there is provided an apparatus for learning of generative model comprising an encoder configured to extract a feature from input data and output a feature vector; a decoder configured to restore the input data on the basis of the feature vector; and a domain module configured to generate domain information to be learned through a generative model into domain vector blocks, each with a size corresponding to the feature vector, concatenate the feature vector and the domain vector block, and input a concatenated vector to the decoder.

The domain module may generate the domain vector blocks according to the number of domain types of the domain information.

The domain module may assign a unique index to each of the domain types of the domain information, set, to 1, a vector value of a domain vector block whose order corresponds to an index of a domain type to be learned among the domain vector blocks, and set, to 0, vector values of remaining domain vector blocks.

In a case where domain information is to be learned for a portion of the input data, the domain module may assign a unique index to each of domain types of the domain information, generate domain vector blocks, each with a size corresponding to the feature vector, according to the number of domain types of the domain information, and activate a domain vector block, whose order corresponds to an index of a domain type to be learned, among the generated domain vector blocks by setting to 1 a vector value of a portion of the domain vector block that corresponds to the portion of the input data and setting to 0 a vector value of a remaining portion.

The input data may be an image, the apparatus may further comprise an object segmentation module configured to distinguish each object included in the image and transmit distinguished object image information to the domain module, and the domain module may input domain information for each object included in the image on the basis of the object image information.

The domain module may assign a unique index to each of domain types of the domain information, generate domain vector blocks, each with a size corresponding to the feature vector, according to the number of domain types of the domain information, and activate a domain vector block, whose order corresponds to an index of a domain type to be changed, among the generated domain vector blocks by setting to 1 a vector value of a portion of the domain vector block that corresponds to a corresponding object and setting to 0 a vector value of a remaining portion on the basis of the object image information.

In another general aspect, there is provided a method for learning of generative model comprising extracting at an encoder, a feature from input data and outputting a feature vector; generating, at a domain module, domain information to be learned through a generative model into a domain vector block with a size corresponding to the feature vector, concatenating the feature vector and the domain vector block, and inputting a concatenated vector to a decoder; and restoring, at the decoder, the input data by reflecting the domain information on the basis of the feature vector.

The generating into the domain vector block may comprise generating, at the domain module, the domain vector blocks according to the number of domain types of the domain information.

The generating into the domain vector blocks may comprise assigning, at the domain module, a unique index to each of the domain types of the domain information, setting, to 1, a vector value of a domain vector block whose order corresponds to an index of a domain type to be learned among the domain vector blocks, and setting, to 0, vector values of remaining domain vector blocks.

The method may further comprise, in a case where domain information is to be learned for a portion of the input data, assigning, at the domain module, a unique index to each of domain types of the domain information; generating domain vector blocks, each with a size corresponding to the feature vector, according to the number of domain types of the domain information; and activating a domain vector block, whose order corresponds to an index of a domain type to be learned, among the generated domain vector blocks by setting to 1 a vector value of a portion of the domain vector block that corresponds to the portion of the input data and setting to 0 a vector value of a remaining portion.

The input data may be an image and the method may further comprise distinguishing, at an object segmentation module, each object included in the image and transmitting distinguished object image information to the domain module and inputting, at the domain module domain information for each object included in the image on the basis of the object image information.

The inputting of the domain information for each object may comprise assigning, at the domain module, a unique index to each of domain types of the domain information, generating domain vector blocks, each with a size corresponding to the feature vector, according to the number of domain types of the domain information, and activating a domain vector block, whose order corresponds to an index of a domain type to be changed, among the generated domain vector blocks by setting to 1 a vector value of a portion of the domain vector block that corresponds to a corresponding object and setting to 0 a vector value of a remaining portion on the basis of the object image information.

In still another general aspect, there is provided a computing device for inserting domain information into a generative model, the computing device comprising one or more processor; a memory; and one or more programs, wherein the one or more programs are stored in the memory and are configured to be executed by the one or more processors and the one or more programs include commands for receiving a feature vector regarding input data from an encoder of the generative model, generating domain information to be learned through the generative model into domain vector blocks, each with a size corresponding to the feature vector, and concatenating the feature vector and the domain vector block and inputting a concatenated vector to a decoder of the generative model.

In yet another general aspect, there is provided a method of inserting domain information into a generative model, which is performed by a computing device comprising one or more processors and a memory in which one or more programs to be executed by the one or more processors are stored, the method comprising receiving a feature vector regarding input data from an encoder of the generative model; generating domain information to be learned through the generative model into domain vector blocks, each with a size corresponding to the feature vector; and concatenating the feature vector and the domain vector block and inputting a concatenated vector to a decoder of the generative model.

According to the disclosed embodiments, domain information is input between the encoder and the decoder, so that learning parameters of the encoder are reduced by half in the case of using the same number of hidden layers. As a result, it is possible to reduce the amount of calculation for learning while using a single generative model and also possible to prevent a decrease in learning speed even with the increased number of domain information.

In addition, in the disclosed embodiment, when a size difference between a feature vector output from the encoder and domain information is greater than or equal to a predetermined reference value, the domain information is resized to correspond to the size of the feature vector and then the feature vector and the domain information are concatenated, so that it is possible to solve a problem of asymmetry of information amount between the feature vector and the domain information and possible to allow the domain information to be sufficiently reflected and learned.

Moreover, since domain information can be inserted irrespective of the size of the output value of the encoder, a method of inserting the domain information may be quantified and be applied to a case where a generative model is not of a bottleneck structure (i.e., a bottleneck structure is not used or a weak bottleneck structure (e.g., a structure in which the encoder does not reduce a size of an image significantly) is used).

BRIEF DESCRIPTION OF THE DRAWINGS

FIG. 7 is a diagram illustrating an image containing a person and a horse as objects in a disclosed embodiment.

Figure 1:
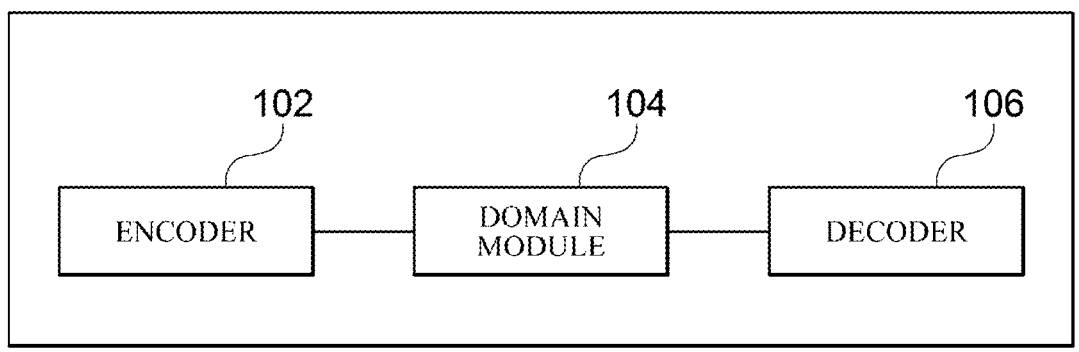
FIG. 1 is a diagram illustrating a configuration of an apparatus for learning of generative model according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

In the following description, terms such as "transfer," "communication," "transmission," and "reception" of a signal or information and other similar terms refer to a signal or information which is directly transmitted from one element to another element and a signal or information which is transmitted from one element to another element via yet another element. Specifically, the transfer or transmission of a signal or information to one element indicates a final destination of the signal or information and does not indicate a direct destination of the signal or information. This is the same in the "reception" of the signal or information. Further, in this specification, the fact that two or more pieces of data or information are related means that when one piece of data (or information) is obtained, at least a part of other data (or information) may be obtained on the basis of the obtained data (or information).

FIG. 1 is a diagram illustrating a configuration of an apparatus for learning of generative model according to one embodiment of the present disclosure.

Referring to FIG. 1, the apparatus 100 for learning of generative model may include an encoder 102, a domain module 104, and a decoder 106. In an exemplary embodiment, a generative model may have a bottleneck structure. That is, the generative model may have a structure in which the encoder 102 reduces the dimensions of input data and then outputs the data and the decoder 106 increases the output value to the dimensions of one-input data. Although a generative model with a bottleneck structure will be described herein as one example, the generative model may be applied to a case where the bottleneck structure is not employed.

The encoder 102 may extract a feature from input data. Hereinafter, a description will be given by taking an image as an example of the input data. However, the input data is not limited to an image.

The encoder 102 may extract a feature by reducing the dimensions of an input image. Specifically, the encoder 102 may include a plurality of hidden layers. Each of the hidden layers may reduce the dimensions of the input image by extracting a feature value (e.g., a maximum value of pixels, an average value of pixels, or the like) of pixels (i.e., 9 pixels) corresponding to a filter while moving the filter with a predetermined size (e.g., a size of 3×3 pixels) at predetermined intervals.

In this case, the encoder 102 may divide the input image into a red (R) channel image, a green (G) channel image, and a blue (B) channel image, and then perform the above-described operation on each of the divided images. An output value of the encoder 102 may be represented as a feature vector for the input image.

The domain module 104 may concatenate domain information with the output value (i.e., feature vector) of the encoder 102 and may input the concatenated value to the decoder 106. That is, in the disclosed embodiment, the domain information is input between the encoder 102 and the decoder 106. In this case, since the domain information enters into the input of the decoder 106, learning parameters of the encoder 102 are reduced by half in the case of using the same number of hidden layers. As a result, it is possible to reduce the amount of calculation for learning and to prevent a decrease in learning speed while using a single generative model.

The domain module 104 may generate a domain vector by vectorizing the domain information. The domain module 104 may concatenate the domain vector with the feature vector, which is an output of the encoder 102, and input the concatenated vector to the decoder 106. The domain information may be a subject (or content) to be learned through a generative model. In an exemplary embodiment, in a case where the input image is an image of a person, the domain information may be hairstyle, race, gender, or the like. Here, the hairstyle, the race, the gender, and the like may each be a domain type.

In an exemplary embodiment, the domain module 104 may vectorize the domain information to be learned through a generative model into a one-hot vector. That is, the domain module 104 may assign a unique index to each domain type and generate a one-hot vector in which a vector value corresponding to an index of a domain vector is 1 and vector values corresponding to the remaining indices are 0 in the vector of the dimensions corresponding to the number of domain types.

For example, when an index of a domain type of hairstyle is 1, an index of a domain type of race is 2, and an index of a domain type of gender is 3, a one-hot vector of the hairstyle is (1, 0, 0), a one-hot vector of the race is (0, 1, 0), and a one-hot vector of the gender is (0, 0, 1). When there are m domain types, the one-hot vector may be a vector of m dimensions.

Figure 2:
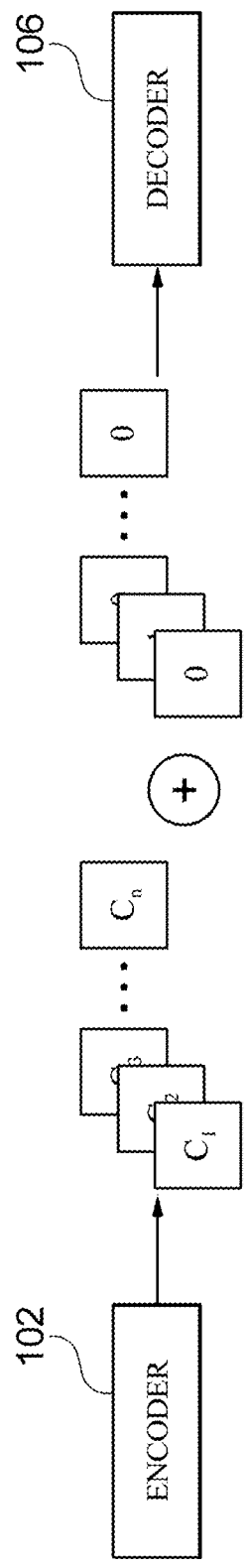
FIG. 2 is a diagram for describing a case in which a feature vector, which is an output of an encoder, and a one-hot vector of domain information are concatenated and then input to a decoder in a disclosed embodiment.

The domain module 104 may concatenate the feature vector, which is the output of the encoder 102, with the one-hot vector of the domain information so as to be the input of the decoder 106, as shown in FIG. 2.

On the other hand, when a size difference between the feature vector output from the encoder 102 and the one-hot vector (domain vector) of the domain information is greater than or equal to a predetermined reference value, the domain module 104 may resize the domain vector to correspond to the size of the feature vector, and then concatenate the feature vector and the domain vector.

That is, in FIG. 2, the feature vector of the encoder 102 has an information amount of n size, whereas the one-hot vector of the domain information has an information amount of 1 size for one type. Hence, as the size of n increases in the feature vector of the encoder 102, asymmetry between the feature vector and the one-hot vector increases. In this state, when the feature vector of the encoder 102 and the one-hot vector of the domain information are concatenated and input to the decoder 106 to be learned, the entire generative model is learned while retaining more amount of information of the image (i.e., input image) input to the encoder 102, and the domain information may not be properly reflected.

Therefore, in the disclosed embodiment, when a size difference between the feature vector output from the encoder 102 and the one-hot vector (domain vector) of the domain information is greater than or equal to the predetermined reference value, the domain vector is resized to correspond to the size of the feature vector and then the feature vector and the domain vector are concatenated, thereby making it possible to solve a problem of asymmetry of information between the feature vector and the domain vector.

Specifically, the domain module 104 may calculate the size of the feature vector output from the encoder 102. For example, when the number of channels is c, a width of an image is w, and a height of the image is h, the image has a size of (c, w, h) and a size of information of the image is c×w×h.

Here, information to be changed when the image passes through a learning layer L of the encoder 102 may be represented by an information size change function L(c, w, h) as shown in Equation 1 below.

$$L(c, w, h) = \left(c \times f, \frac{w - f_w}{s}, \frac{h - f_h}{s}\right) \quad \text{(Equation 1)}$$

Here, s denotes an interval at which a filter moves in the image, $f_w$ denotes a width of the filter, $f_h$ denotes a height of the filter, and f denotes the number of filters.

In Equation 1, s causes the image size (w, h) to be reduced to (w/s, h/s) and f, which is the number of filters, causes the number of channels c to be changed to c×f. In addition, the width $f_w$ and the height $f_h$ of the filter cause the image size (w, h) to be changed to (w-$f_w$, h-$f_h$).

Here, a size of information (information changed when the image passes through the learning layer L) according to Equation 1 may be represented by the following Equation 2.

$$|L(c, w, h)| = c \times f \times \frac{w - f_w}{s} \times \frac{h - f_h}{s} \quad \text{(Equation 2)}$$

Also, when there are i learning layers in the encoder 102, information (information on a changed size of an image), such as $L_i = L(L_{i-1})$, may be recursively calculated according to the immediately previous learning layer.

Figure 3:
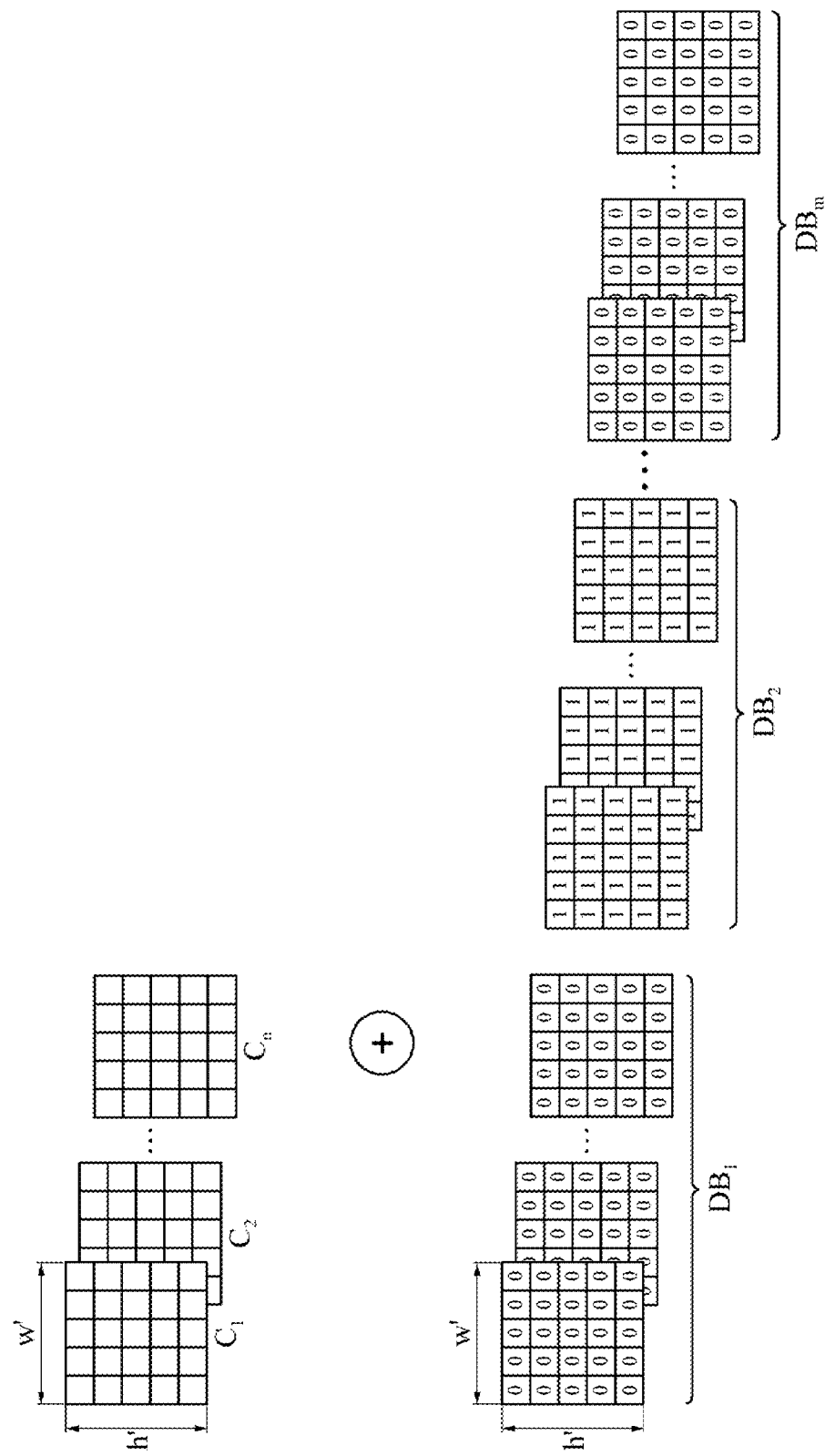
FIG. 3 is a diagram illustrating a process in which a domain module concatenates a feature vector output from an encoder and domain vector block.

The domain module 104 may generate a domain vector block with the same size as the feature vector output from the encoder 102. In this case, the domain module 104 may generate the same number of domain vector blocks as the number of domain types. FIG. 3 is a diagram illustrating a process in which the domain module 104 concatenates the feature vector output from the encoder 102 and the domain vector block.

Referring to FIG. 3, a case in which the size of the feature vector output from the encoder 102 is (n, w', h') will be described. That is, the feature vector output from the encoder 102 has n channels and an image of each channel has a width of w' and a height of h'.

Here, the domain module 104 may generate a domain vector block DB with the same size as the feature vector output from the encoder 102. That is, the domain module 104 may generate a domain vector block which has n channels and has an image with a width of w' and a height of h'.

In this case, the domain module 104 may generate the same number of domain vector blocks $DB_1$, $DB_2$, ..., and $DB_m$ as the number m of the domain types. Each of the domain vector blocks $DB_1$, $DB_2$, ..., and $DB_m$ has n channels and an image with a width of w' and a height of h', and may be of the same size as the feature vector output from the encoder 102.

The domain module 104 may insert a vector value into each of the domain vector blocks $DB_1$, $DB_2$, ..., and $DB_m$ on the basis of a one-hot vector of a domain type to be learned. For example, a case in which there are three domain types, hairstyle, race, and gender, and an index of hairstyle is 1, an index of race is 2, and an index of gender is 3 will be described.

The domain module 104 may generate three domain vector blocks $DB_1$, $DB_2$, and $DB_3$, each with the same size as the feature vector output from the encoder 102. In a case where the domain type to be learned is race, since a one-hot vector of the domain type of interest is (0, 1, 0), vector values of a first domain vector block $DB_1$ may be all set to 0, vector values of a second domain vector block $DB_2$ may be all set to 1, and vector values of a third domain vector block $DB_3$ may be all set to 0.

In other words, among the domain vector blocks $DB_1$, $DB_2$, and $DB_3$, the vector values of the second domain vector block $DB_2$ that corresponds to an index order of the domain type of interest may be set to 1, and the vector values of the remaining domain vector blocks $DB_2$ and $DB_3$ may be set to 0.

In the disclosed embodiment, a vector value of the domain vector block may be represented by 0 or 1, and when a vector value of a domain vector block is represented as 1, it may indicate that the corresponding domain vector block is activated. In this case, in the above example, the second domain vector block $DB_2$ may be represented as being activated.

As such, when the domain vector block with the size corresponding to the size of the feature vector output from the encoder 102 is formed and the feature vector and the domain vector blocks are concatenated to be input to the decoder 106, it is possible to solve a problem of asymmetry between an output value of the encoder 102 and a domain information amount to be input and possible to allow the domain information to be sufficiently reflected and learned.

Also, since the domain information can be inserted irrespective of the size of the output value of the encoder 102, a method of inserting the domain information may be quantified and be applied to a case where a generative model is not of a bottleneck structure (i.e., a bottleneck structure is not used or a weak bottleneck structure (e.g., a structure in which the encoder 102 does not reduce a size of an image significantly) is used). As a result, learning that reflects various domain information may be performed on high-capacity images, such as semiconductor wafer images and the like, and high-dimensional data.

Hereinabove, the information input to the encoder 102 is described as being a two-dimensional image, but when information input to the encoder 102 is three- or more dimensional, a domain vector block with the same size as the feature vector output from the encoder 102 may be generated in the same manner as described above.

Figure 4:
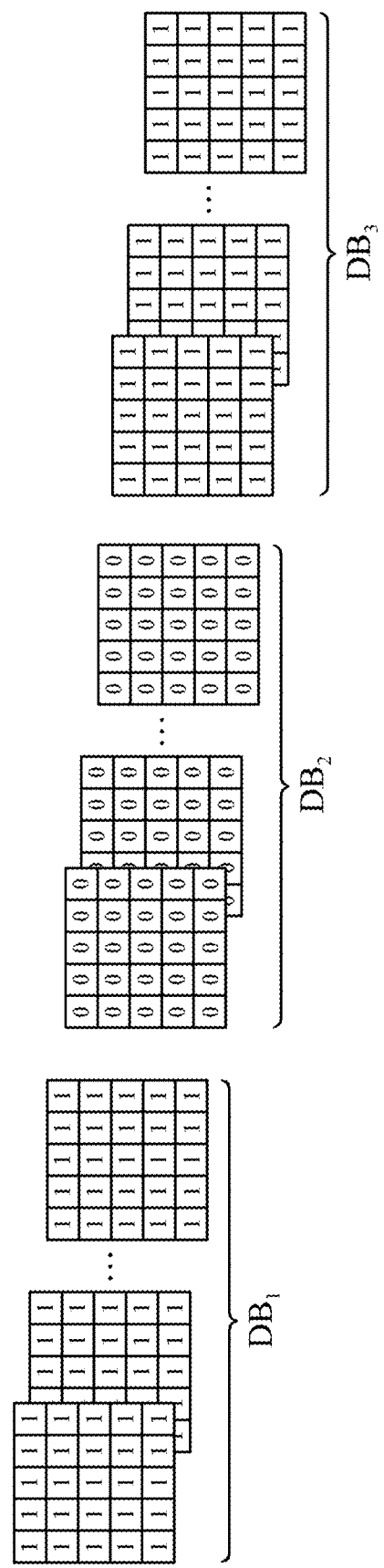
FIG. 4 is a diagram for describing a case in which a plurality of domain types are input as domain information in one embodiment.

Meanwhile, the domain module 104 may input a plurality of domain types as domain information. For example, in the above example, when a domain type of hairstyle (an index is 1 and an one-hot vector is (1,0,0) and a domain type of race (an index is 3 and an one-hot vector is (0, 0, 1) are to be learned, the domain module 104 may generate three domain vector blocks DB 1, $DB_2$, and $DB_3$, each with the same size as the feature vector output from the encoder 102, as shown in FIG. 4.

Here, the domain module 104 may set all the vector values of the first domain vector block $DB_1$ to 1, all the vector values of the second domain vector block $DB_2$ to 0, and all the vector values of the third domain vector block $DB_3$ to 1. In other words, corresponding domain vector blocks (the first domain vector block $DB_1$ and the third domain vector block $DB_3$) may be activated by concatenating the one-hot vector values of the domain types to be learned.

Figure 5:
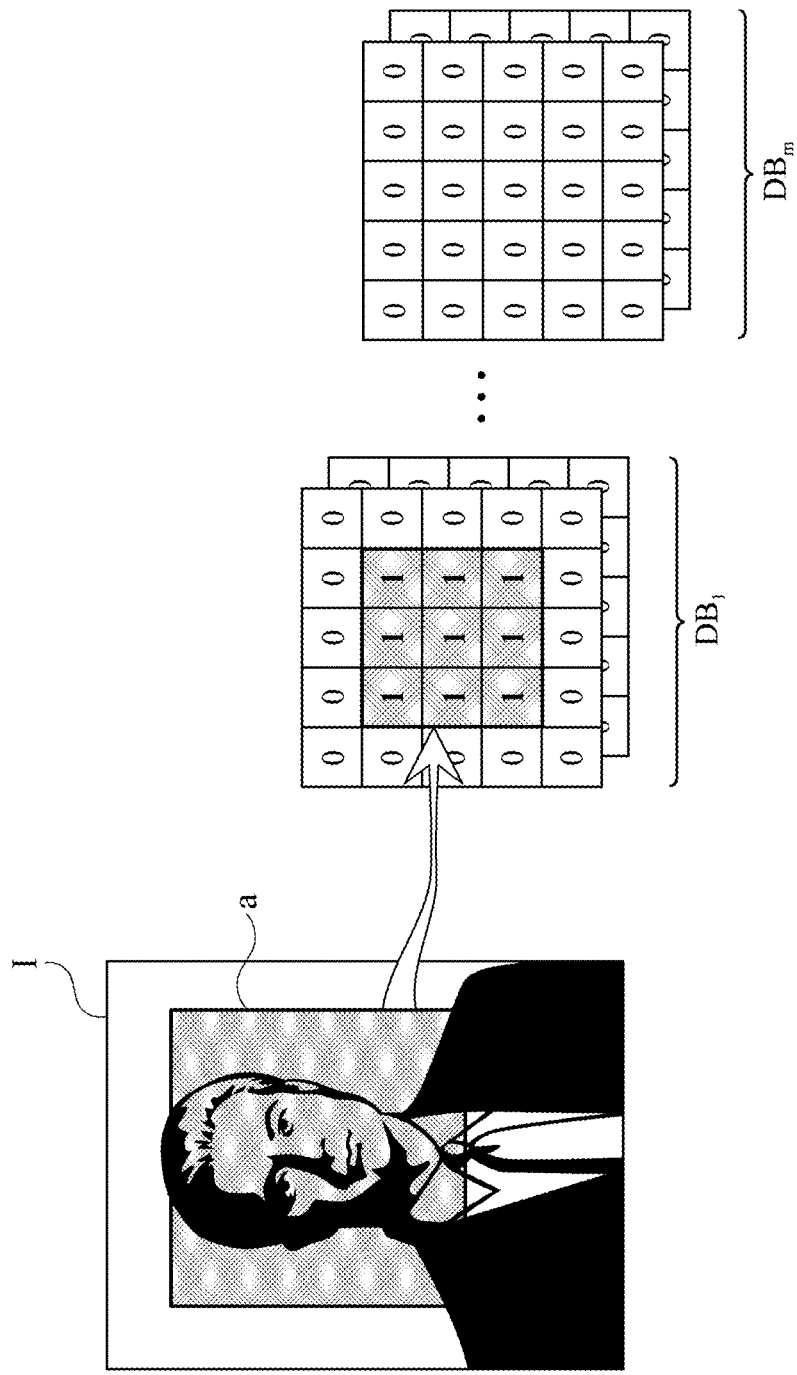
FIG. 5 is a diagram schematically illustrating a state in which domain information is learned for a portion of an input image in a disclosed embodiment.

In addition, the domain module 104 may allow domain information to be learned for only a portion of an input image. FIG. 5 is a diagram schematically illustrating a state in which the domain information is learned for a portion of an input image in a disclosed embodiment.

Referring to FIG. 5, when domain information is learned for a specific portion a of an input image I, the domain module 104 may generate domain vector blocks, each with the same size as the feature vector output from the encoder 102, and may select a domain vector block corresponding to the domain type to be learned from among the generated domain vector blocks. For example, when a domain type to be learned is hairstyle with an index of 1, the domain module 104 may select the first domain vector block, whose order corresponds to the index of the corresponding domain type from among the domain vector blocks.

The domain module 104 may set vector values of a portion in the selected domain vector block that corresponds to the specific portion a to 1 and set vector values of the remaining portion to 0. That is, the domain module 104 may activate the portion in the selected domain vector block that corresponds to the specific portion a, thereby enabling the corresponding domain type to be learned only for the specific portion a of the input image I.

Such a method may be applied to a case where a generative model is not of a bottleneck structure. That is, when the size of the input image is output intact without being reduced in the encoder 102, domain information may be learned only in a specific portion of the input image.

According to a generative model in accordance with the disclosed embodiment, an output value may be generated by changing domain information for each object in the input image. In other words, according to a generative model in which domain information is learned using the domain vector blocks, an output value may be generated by changing the domain information for each object in the input image.

Figure 6:
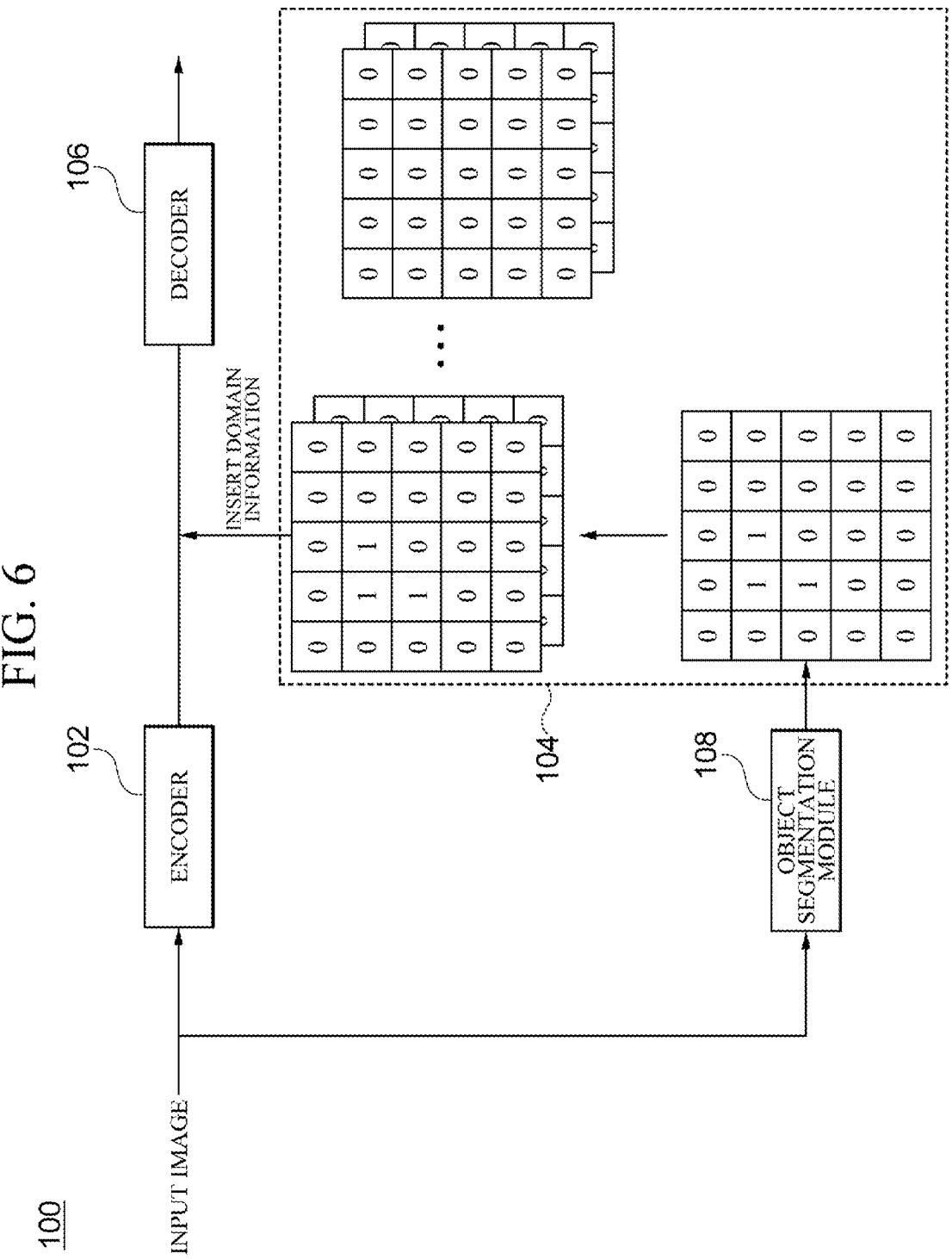
FIG. 6 is a diagram schematically illustrating a state in which an output value is generated by changing domain information for each object of an input image in a disclosed embodiment.

FIG. 6 is a diagram schematically illustrating a state in which an output value is generated by changing domain information for each object of an input image in a disclosed embodiment. Here, the generative model may have a structure in which a size of an input image is output intact without being reduced in the encoder 102.

Specifically, the apparatus 100 for learning of generative model may further include an object segmentation module 108 to segment each object in an input image. For example, when objects of an input image include a horse and a person, as shown in FIG. 7, the object segmentation module 108 may distinguish each object ((b) in FIG. 7) in the input image ((a) in FIG. 7) and transmit distinguished object image information to the domain module 104.

For example, the object segmentation module 108 may transmit object image information regarding a person in the input image to the domain module 104. Here, in the object image information, a portion of the input image that corresponds to a person may have a pixel value of 1 and the remaining portion may have a pixel value of 0.

The domain module 104 may generate domain vector blocks, each with the same size as the feature vector output from the encoder 102, and select a domain vector block that corresponds to a domain type to be changed from among the generated domain vector blocks. For example, when the domain type to be changed is hairstyle with an index of 1, the domain module 1 may select the first domain vector block from among the domain vector blocks.

The domain module 104 may set a vector value of a portion in the selected domain vector block that corresponds to a person to 1 on the basis of the object image information regarding a person and set a vector value of the remaining portion to 0. That is, the domain module 104 may activate the portion in the selected domain vector block that corresponds to a person and insert the portion as domain information. Then, the decoder 106 outputs a result in which the corresponding domain type is reflected in the object image regarding a person in the input image.

In the above example, it is described that the number of domain types to be changed is one, but the embodiment is not limited thereto and several domain types may be simultaneously changed. For example, when domain types to be changed are hairstyle with an index of 1 and race with an index of 3, the first domain vector block and the third domain vector block are selected from among the domain vector blocks and domain information is inserted by setting, to 1, vector values of a portion of each of the first domain vector block and the third domain vector block that corresponds to a person on the basis of the object image information regarding a person and setting, to 0, vector values of the remaining portions. Accordingly, an output value may be generated for each of the hairstyle and the race by changing domain information for each object.

Here, when an output value is to be generated by changing domain information for a horse in the input image, the domain module 104 may receive object image information regarding a horse from the object segmentation module 108, select a domain vector block that corresponds to the domain type to be learned from among the domain vector blocks, activate a corresponding portion in the selected domain vector block on the basis of the object information regarding a horse, and input the portion as domain information.

In the present disclosure, a module may indicate a functional or structural coupling of hardware for executing a technical idea of embodiments of the present disclosure and software for operating the hardware. For example, each "module" may mean a predetermined code and a logical unit of a hardware resource for performing the predetermined code. However, it will be understood by a person skilled in the technical field of the present disclosure that the each functional unit may not always mean a physically connected code or a single type of hardware.

Figure 8:
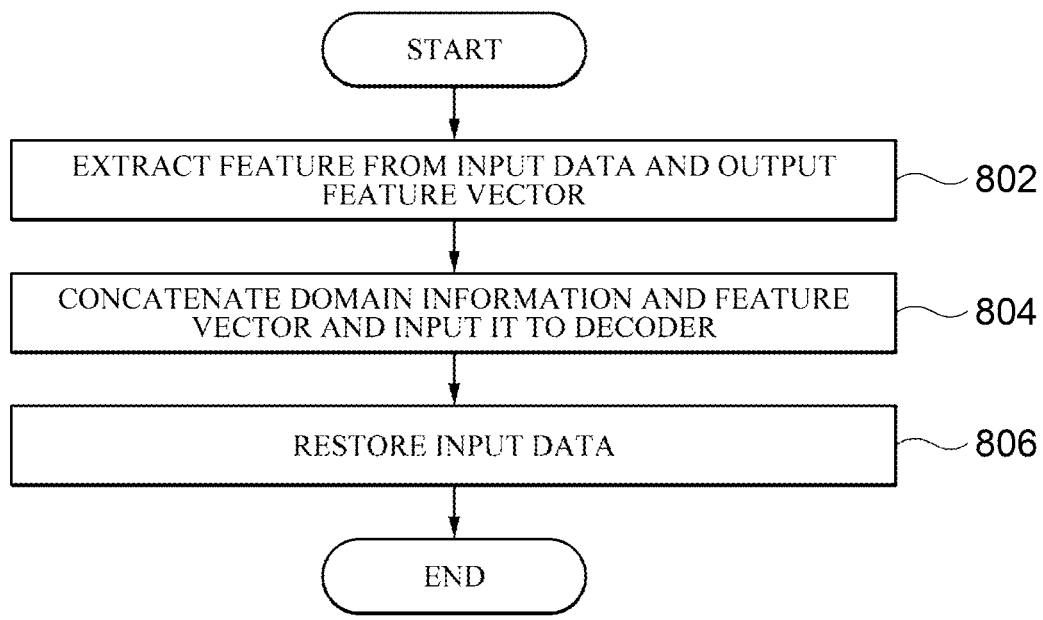
FIG. 8 is a flowchart illustrating a method of learning of generative model according to one embodiment of the present disclosure.

FIG. 8 is a flowchart illustrating a method 800 of learning of generative model according to one embodiment of the present disclosure. In the illustrated flowchart, the method is described as being divided into a plurality of operations. However, it should be noted that at least some of the operations may be performed in a different order or may be combined into fewer operations or further divided into more operations. In addition, some of the operations may be omitted, or one or more extra operations, which are not illustrated, may be added to the flowchart and be performed.

In operation 802, an encoder 102 extracts a feature from input data and output a feature vector. The input data may be, for example, a two-dimensional image, but is not limited thereto, and may be one-dimensional data or three- or more dimensional data.

In operation 804, a domain module 104 concatenates domain information to be learned in a generative model and the feature vector output from the encoder 102 and inputs a concatenation result to a decoder 106.

In operation 806, the decoder 106 restores input data by reflecting domain information on the basis of the feature vector.

Figure 9:
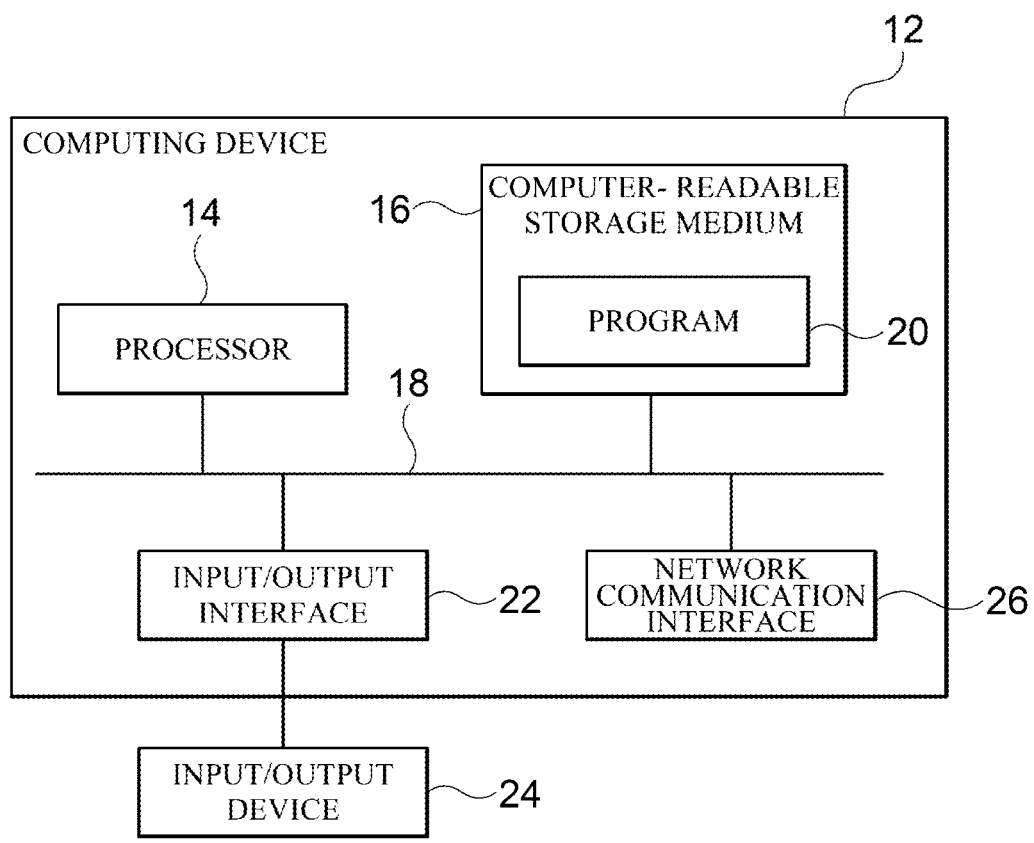
FIG. 9 is a block diagram for describing a computing environment including a computing device suitable to be used in exemplary embodiments.

FIG. 9 is a block diagram for describing a computing environment 10 including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be an apparatus 100 for learning of generative model. In addition, the computing device 12 may be an encoder 12. Also, the computing device 12 may be a domain module 104. The computing device 12 may be a decoder 106.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The program 20 stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An apparatus for learning of generative model, comprising:
at least one hardware processor configured to:
extract a feature from input data;
output a feature vector;
generate domain information to be used for learning a generative model into one or more domain vector blocks, each with the same size of the feature vector;
concatenate the feature vector and the one or more domain vector blocks; and
restore the input data by reflecting the domain information on the basis of the concatenated vector,
wherein the number of the generated domain vector blocks is the same as the number of domain types of the domain information; and
the at least one hardware processor is further configured to assign a unique index to each of the domain types of the domain information, set, to 1, a vector value of a domain vector block whose order corresponds to an index of a domain type to be learned among the one or more domain vector blocks, and set, to 0, vector values of remaining domain vector blocks.

2. The apparatus of claim 1, wherein in a case where domain information is to be learned for a portion of the input data, the at least one hardware processor is further configured to assign a unique index to each of domain types of the domain information, generate one or more domain vector blocks, each with a size being the same as a size of the feature vector, according to the number of domain types of the domain information, and activate a domain vector block, whose order corresponds to an index of a domain type to be learned, among the generated domain vector blocks by setting to 1 a vector value of a portion of the domain vector block that corresponds to the portion of the input data and setting to 0 a vector value of a remaining portion.

3. The apparatus of claim 1, wherein the input data is an image, the at least one hardware processor is further configured to distinguish each object included in the image and input domain information for each object included in the image on the basis of the distinguished object image information.

4. The apparatus of claim 3, wherein the at least one hardware processor is further configured to assign a unique index to each of domain types of the domain information, generate one or more domain vector blocks, each with a size corresponding to the feature vector, according to the number of domain types of the domain information, and activate a domain vector block, whose order corresponds to an index of a domain type to be changed, among the generated domain vector blocks by setting to 1 a vector value of a portion of the domain vector block that corresponds to a corresponding object and setting to 0 a vector value of a remaining portion on the basis of the object image information.

5. A method for learning of generative model, comprising:
extracting, at an encoder, a feature from input data and outputting a feature vector;
generating, at a domain module, domain information to be used for learning a generative model into one or more domain vector blocks with the same size of the feature vector, wherein the number of the generated one or more domain vector blocks is the same as the number of domain types of the domain information;
concatenating, at a domain module, the feature vector and the one or more domain vector blocks;
inputting the concatenated vector to a decoder; and restoring, at the decoder, the input data on the basis of the concatenated vector, wherein the generating into the one or more domain vector blocks comprises assigning, at the domain module, a unique index to each of the domain types of the domain information, setting, to 1, a vector value of a domain vector block whose order corresponds to an index of a domain type to be learned among the one or more domain vector blocks, and setting, to 0, vector values of remaining domain vector blocks.

6. The method of claim 5, further comprising, in a case where domain information is to be learned for a portion of the input data, assigning, at the domain module, a unique index to each of domain types of the domain information;

generating one or more domain vector blocks, each with the size of the feature vector, according to the number of domain types of the domain information; and activating a domain vector block, whose order corresponds to an index of a domain type to be learned, among the generated domain vector blocks by setting to 1 a vector value of a portion of the domain vector block that corresponds to the portion of the input data and setting to 0 a vector value of a remaining portion.

7. The method of claim 5, wherein the input data is an image and the method further comprises:

distinguishing, at an object segmentation module, each object included in the image and transmitting distinguished object image information to the domain module; and inputting, at the domain module, domain information for each object included in the image on the basis of the object image information.

8. The method of claim 7, wherein the inputting of the domain information for each object comprises assigning, at the domain module, a unique index to each of domain types of the domain information, generating one or more domain vector blocks, each with the same size of the feature vector, according to the number of domain types of the domain information, and activating a domain vector block, whose order corresponds to an index of a domain type to be changed, among the generated domain vector blocks by setting to 1 a vector value of a portion of the domain vector block that corresponds to a corresponding object and setting to 0 a vector value of a remaining portion on the basis of the object image information.

9. A computing device for inserting domain information into a generative model, the computing device comprising:
one or more processor;
a memory; and
one or more programs, wherein the one or more programs are stored in the memory and are configured to be executed by the one or more processors; and the one or more programs include commands for:

receiving a feature vector regarding input data from an encoder of the generative model;

generating domain information to be used for learning the generative model into one or more domain vector blocks, each with the same size of the feature vector, wherein the number of the generated one or more domain vector blocks is the same as the number of domain types of the domain information; and concatenating the feature vector and the one or more domain vector blocks and inputting the concatenated vector to a decoder of the generative model, wherein the generating into the one or more domain vector blocks comprises assigning, at the domain module, a unique index to each of the domain types of the domain information, setting, to 1, a vector value of a domain vector block whose order corresponds to an index of a domain type to be learned among the one or more domain vector blocks, and setting, to 0, vector values of remaining domain vector blocks.

10. A method of inserting domain information into a generative model, which is performed by a computing device comprising one or more processors and a memory in which one or more programs to be executed by the one or more processors are stored, the method comprising:

receiving a feature vector regarding input data from an encoder of the generative model;

generating domain information to be used for learning the generative model into one or more domain vector blocks, each with the size of the feature vector, wherein the number of the generated one or more domain vector blocks is the same as the number of domain types of the domain information; and concatenating the feature vector and the one or more domain vector blocks and inputting the concatenated vector to a decoder of the generative model, the generating into the one or more domain vector blocks comprises assigning, at the domain module, a unique index to each of the domain types of the domain information, setting, to 1, a vector value of a domain vector block whose order corresponds to an index of a domain type to be learned among the one or more domain vector blocks, and setting, to 0, vector values of remaining domain vector blocks.

* * * * *